(12) United States Patent
Winstead et al.

(10) Patent No.: US 6,232,924 B1
(45) Date of Patent: *May 15, 2001

(54) FLAT BLADE ANTENNA AND FLIP MOUNTING STRUCTURES

(75) Inventors: Russell Evans Winstead, Raleigh; James D. MacDonald, Jr., Apex; Nils Rydbeck, Cary, all of NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,048

(22) Filed: Dec. 21, 1998

(51) Int. Cl.⁷ .............................. H01Q 1/24; H04M 1/00

(52) U.S. Cl. ............................ 343/702; 379/433

(58) Field of Search .................... 343/702, 878, 343/880, 882; 379/433, 434; 455/575, 90, 351; H01Q 1/24

(56) References Cited

U.S. PATENT DOCUMENTS

| | | | |
|---|---|---|---|
| D. 318,050 | 7/1991 | Elbaz et al. | D14/138 |
| D. 347,221 | 5/1994 | Siddoway | D14/138 |
| D. 352,503 | 11/1994 | Nagele | D14/138 |
| D. 367,062 | 2/1996 | Tahmassebpur | D14/230 |
| D. 379,356 | 5/1997 | Liu et al. | D14/230 |
| D. 382,873 | 8/1997 | MacDonald, Jr. et al. | D14/138 |
| D. 398,611 | 9/1998 | Read | D14/230 |
| D. 407,716 | 4/1999 | Park | D14/138 |
| D. 421,017 | 2/2000 | Phipps | D14/230 |
| 4,121,218 | 10/1978 | Irwin et al. | 343/702 |
| 4,471,493 | 9/1984 | Schober | 455/90 |
| 4,992,799 | 2/1991 | Garay | 343/702 |
| 5,260,998 | 11/1993 | Takagi | 379/433 |
| 5,337,061 | 8/1994 | Pye et al. | 343/702 |
| 5,374,937 | 12/1994 | Tsunekawa et al. | 343/702 |
| 5,507,013 | 4/1996 | Weadon et al. | 455/90 |
| 5,572,223 | 11/1996 | Phillips et al. | 343/702 |
| 5,583,519 | 12/1996 | Koike | 343/702 |
| 5,651,063 | 7/1997 | Ji et al. | 379/433 |
| 5,659,888 | 8/1997 | Kato et al. | 455/475 |

(List continued on next page.)

FOREIGN PATENT DOCUMENTS

| | | |
|---|---|---|
| 2191143 | 6/1997 | (CA) . |
| 0415703A1 | 3/1991 | (EP) . |
| 0 613 207 A1 | 2/1994 | (EP) . |
| 0 634 806 A1 | 4/1994 | (EP) . |
| 2 213 998 | 8/1989 | (GB) . |
| 2 253 949 | 9/1992 | (GB) . |
| 2317993 | 4/1998 | (GB) . |
| WO 94/19873 | 9/1994 | (WO) . |
| WO 98/01919 | 1/1998 | (WO) . |
| WO 98/12772 | 3/1998 | (WO) . |
| WO 98/09342 | 5/1998 | (WO) . |

Primary Examiner—Michael C. Wimer
(74) Attorney, Agent, or Firm—Myers Bigel Sibley & Sajovec, P.A.

(57) ABSTRACT

Flat blade antenna and flip mounting structures and associated methods include biasing the flat blade antenna to travel beyond a predetermined angle of rotation to separate from the flip in the open position. The flat blade antenna and flip are mounted to the radiotelephone via dual hinges and have low turning force components which provide a predetermined force vector to facilitate the blade antenna opening to a desired operative position. The flat blade antenna rotates separate from the flip. The flat blade antenna can open to an angular position greater than the adjacently mounted flip. The biasing mounting configuration provides turning forces which facilitates both the opening and closing of the antenna.

33 Claims, 12 Drawing Sheets

U.S. PATENT DOCUMENTS

| | | | |
|---|---|---|---|
| 5,659,889 | 8/1997 | Cockson | 455/575 |
| 5,779,496 | 7/1998 | Bolinger et al. | 439/377 |
| 5,828,343 | 10/1998 | MacDonald, Jr. et al. | 343/702 |
| 5,838,789 | 11/1998 | Mendolia | 379/433 |
| 5,907,306 | 5/1999 | Karabinis et al. | 343/702 |
| 5,936,587 | 8/1999 | Gudilev et al. | 343/752 |
| 5,978,655 | 11/1999 | Ohura et al. | 455/41 |
| 5,995,052 * | 11/1999 | Sadler et al. | 343/702 |
| 6,016,125 | 1/2000 | Johansson | 343/702 |
| 6,031,503 | 2/2000 | Preiss, II et al. | 343/770 |
| 6,043,794 | 3/2000 | Faulkner et al. | 343/872 |

\* cited by examiner

FLAT BLADE ANTENNA AND FLIP MOUNTING STRUCTURES

FIELD OF THE INVENTION

The present invention relates generally to communication devices, and more particularly to radiotelephones.

BACKGROUND OF THE INVENTION

Recent radiotelephones have incorporated low profile designs. Low profile designs typically include a thin lightweight cover member which "flips" over the radiotelephone body when the radiotelephone is closed and "flips" above and away from the radiotelephone body when the radiotelephone is opened. As such, this member is called a "flip." The radiotelephone also includes an antenna element which during operation extends above the radiotelephone body. Radiotelephones have conventionally used various types of translating antennas such as side-mounted swivel antennas and telescoping antennas. In any event, the antenna and flip typically stow adjacent to the radiotelephone body when closed and extend above the radiotelephone body when opened.

In a preferred low-profile application, the antenna is configured as a flexible "blade" or "strip" (i.e., a flexible strip transmission line) radiating element which can be very narrow, thin, and flexible. The blade antenna can rotate and extend similar to the flip described above. However, this flexibility can result in unwanted deformation and unappealing gaps in the cover when the flip and antenna are in the closed or stow position. Further, during use, the blade antenna can be subjected to use or abuse which can misalign or deform the blade or strip antenna. As such, over time, it can be very difficult for the flip and strip antenna to maintain a desirable aesthetic cover shape that can repeatedly rotate between the open and closed positions.

In addition, in operation, the blade antenna and the flip typically rotate above and away from the radiotelephone body such that a user can position the flip adjacent his or her ear. Unfortunately, extension of the strip antenna adjacent the flip can subject the radiotelephone to reduced sensitivity due to blocked signals or interference caused by the position of the antenna relative to the user's anatomy (typically the head). Further, antennas typically have preferred operative positions which is controlled by a user. Unfortunately, the user can improperly extend the antenna or position the antenna such that it is subject to unwanted interference.

Objects and Summary of the Invention It is therefore an object of the invention to provide a radiotelephone with a low-profile flip and strip or blade antenna configuration which is structurally tolerant of repeated openings and closings.

It is an additional aspect of the invention to provide a radiotelephone with an improved flip and flexible strip antenna mounting structure which can reduce the interference associated with the user during operation.

It is another object of the present invention to provide a radiotelephone with a mounting structure which provides an RF signal path for a strip antenna which can improve sensitivity and reduce interference associated with the position of the antenna in use over that of conventional antennas used with flip radiotelephones.

It is still another object of the present invention to provide a mounting structure and associated method which can facilitate the antenna's translation into preferred operative positions.

These and other objects of the present invention are satisfied by the present invention, which is directed to a radiotelephone having a biasing structure associated with a flat blade antenna which biases the antenna to open toward a preferred operative position. A first aspect of this invention is an antenna and flip hinge assembly for a radiotelephone, wherein the assembly comprises a radiotelephone body with first and second end portions and a flat blade antenna pivotably attached to the radiotelephone body first end portion. The radiotelephone also includes a flip member pivotably attached to the radiotelephone body first end portion. The flip member is attached on the first end portion spaced-apart from the flat blade antenna. The flat blade antenna and the flip member are individually rotatable from a first stow position, in which each of the flat blade antenna and the flip member are positioned to overlie the radiotelephone body, to a second open position, in which the flip member and the flat blade antenna are positioned above and extend longitudinally away from the radiotelephone body relative to the stow position. The flip member moves through a first angle of rotation relative to the radiotelephone body and the flat blade antenna moves through a second or additional angle of rotation relative to the radiotelephone body, with the second angle of rotation being greater than the first angle of rotation. The assembly includes a biasing structure which is operably associated with the blade antenna. The biasing structure is configured to bias or pre-dispose the antenna to rotate toward the open position, preferably beyond the first angle of rotation (i.e., past the flip member). In a preferred embodiment, the biasing structure is configured to provide a variable rotational force or torque vector which increases and then decreases during both deployment and closure of the flat blade antenna to bias the antenna to the open and stow positions.

A second aspect of the invention is an antenna hinge assembly for a radiotelephone. The antenna hinge assembly comprises a radiotelephone body having a hinging portion with a first cavity. A cylindrical bearing retainer comprising an outer surface and an inner cavity is positioned in and affixed to the radiotelephone body first cavity such that the bearing retainer transversely extends a distance out of the radiotelephone first cavity. The antenna hinge assembly also includes a blade antenna having a lower portion with a transversely extending shell with an inner wall. The shell is sized and configured to receive a portion of the bearing retainer therein. The blade antenna is pivotably attached to the radiotelephone body hinging portion such that the shell inner wall rides on the bearing retainer outer surface as the blade antenna rotates during use. The blade antenna is rotatable from a first stow position, in which the blade antenna substantially overlies the radiotelephone body, to a second open position, in which the blade antenna longitudinally extends above and away from the radiotelephone body. The assembly also includes a detent cam having a cam surface operably associated with the blade antenna positioned intermediate the blade antenna and the body hinging portion and a detent spring operably associated with the detent cam. The blade antenna rotates from the first stow position to the second open position. Preferably, a variable (increasing and then decreasing) turning force is introduced onto the blade antenna to facilitate the advancement of the blade antenna toward a preferred operational or open position. In a preferred embodiment, the detent cam, the detent spring, and the blade antenna pivotable attachment, define a biasing structure which biases the blade antenna toward the open position. It is also preferred that the detent cam surface be configured to introduce variable turning forces on the blade antenna to bias the blade antenna forward and facilitate the return of the blade antenna back to the stow position during closing.

An additional aspect of the present invention is similar to the antenna assembly above, but incorporates a flip member mounting structure as well. This embodiment is directed to a flip and antenna hinge assembly for a radiotelephone which comprises a radiotelephone body with a hinging portion with transversely extending first and second cavities. Each of the cavities have opposing first and second ends and are spaced-apart. The assembly includes first and second cylindrical bearing retainers. The first bearing retainer comprises an outer surface and an inner cavity positioned in the first cavity of the radiotelephone body hinging portion such that the first bearing retainer transversely extends a distance out of one end of the first cavity. The second bearing retainer comprises an outer surface and an inner cavity positioned in the second cavity of the radiotelephone body hinging portion such that the second bearing retainer transversely extends a distance outside one end of the second cavity. The assembly also includes a blade antenna having a lower hinging portion pivotably attached to the radiotelephone body hinging portion. The blade antenna lower hinging portion is sized and configured to receive a portion of the first bearing retainer therein. The blade antenna is rotatable from a first stow position, in which the blade antenna substantially overlies the radiotelephone body, to a second open position, in which the blade antenna longitudinally extends above and away from the radiotelephone body. The assembly further includes a flip member having a lower hinging portion pivotably attached to the radiotelephone body-hinging portion. The flip member is configured to receive a portion of the second bearing retainer therein. The flip member is rotatable from a first stow position, in which the flip member substantially overlies the radiotelephone body, to a second open position, in which the flip member longitudinally extends above and away from the radiotelephone body. The assembly additionally includes a detent cam with a cam surface is operably associated with the blade antenna and is positioned intermediate the blade antenna and the radiotelephone body hinging portion and a detent spring operably associated with the detent cam. Preferably, as the blade antenna rotates from the first stow position to the second open position, the blade antenna is biased or predisposed to turn or advance beyond or to a preferred position (preferably beyond the flip open position).

In a preferred embodiment, the detent cam surface introduces variable rotational turning forces on the blade antenna to facilitate the return of the blade antenna to predetermined angular positions during closing. Also, it is preferred that the blade antenna opens beyond about 180 degrees to travel to the open position (and beyond the flip member) relative to the stow position.

Another aspect of the present invention is a method of mounting a flat blade antenna and flip member to a radiotelephone. The method comprises the steps of pivotably mounting a flat blade antenna to an end portion of the radiotelephone and separately pivotably mounting a flip member to the same end portion of the radiotelephone. A biasing structure is also mounted to the radiotelephone end portion so that the blade antenna is biased to travel beyond a predetermined position angle of rotation in the opening direction such that the blade antenna travels through a greater angle of rotation than the flip member to bias the blade antenna away from the flip member in the open position. Preferably, the biasing structure mounting step includes assembling the biasing structure so that it introduces a variable rotational turning force vector onto the blade antenna during opening. In a preferred embodiment, the variable rotational force vector increases at about 180 degrees from the stow position and decreases thereafter to facilitate the blade antenna opening to above 180 degrees from its stow position.

The present invention is advantageous because the low turning force dual hinge mounting structure allows the flip and antenna to be individually rotated in a manner which can protect the flexible blade antenna from deformation, handling abuse and wear, and provides an appealing aesthetic appearance. In addition, the rotation of the blade antenna separate from the flip allows the antenna to be positioned during use such that it minimizes interference with the anatomy of the user. The low-force mounting structure allows the antenna to be easily positioned in preferred positions during use. In addition, in a preferred embodiment, the design of the mounting structure biases or pre-disposes the antenna to open and close into preferred operative and stow positions. The forward biasing structure also facilitates the antenna to translate and open beyond the flip during use thereby reducing interference with a user by spatially separating the flip and the antenna and positioning the antenna away from the user.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Layers and regions may be exaggerated for clarity.

In the application, certain terms have been used to describe the positional relationships of certain of the features. As used herein, the term "longitudinal" and derivatives thereof refer to the general direction defined by the longitudinal axis of the radiotelephone that extends between opposing top and bottom ends of the radiotelephone body when held in the hand of a user. As used herein, the terms "outer," "outward," "lateral" and derivatives thereof refer to the direction defined by a vector originating at the longitudinal axis of the radiotelephone and extending horizontally and perpendicularly thereto. Conversely, the terms "inner," "inward," and derivatives thereof refer to the direction opposite that of the outward direction. Together the "inward" and "outward" directions comprise the "transverse" direction.

Radiotelephones

Figure 1:
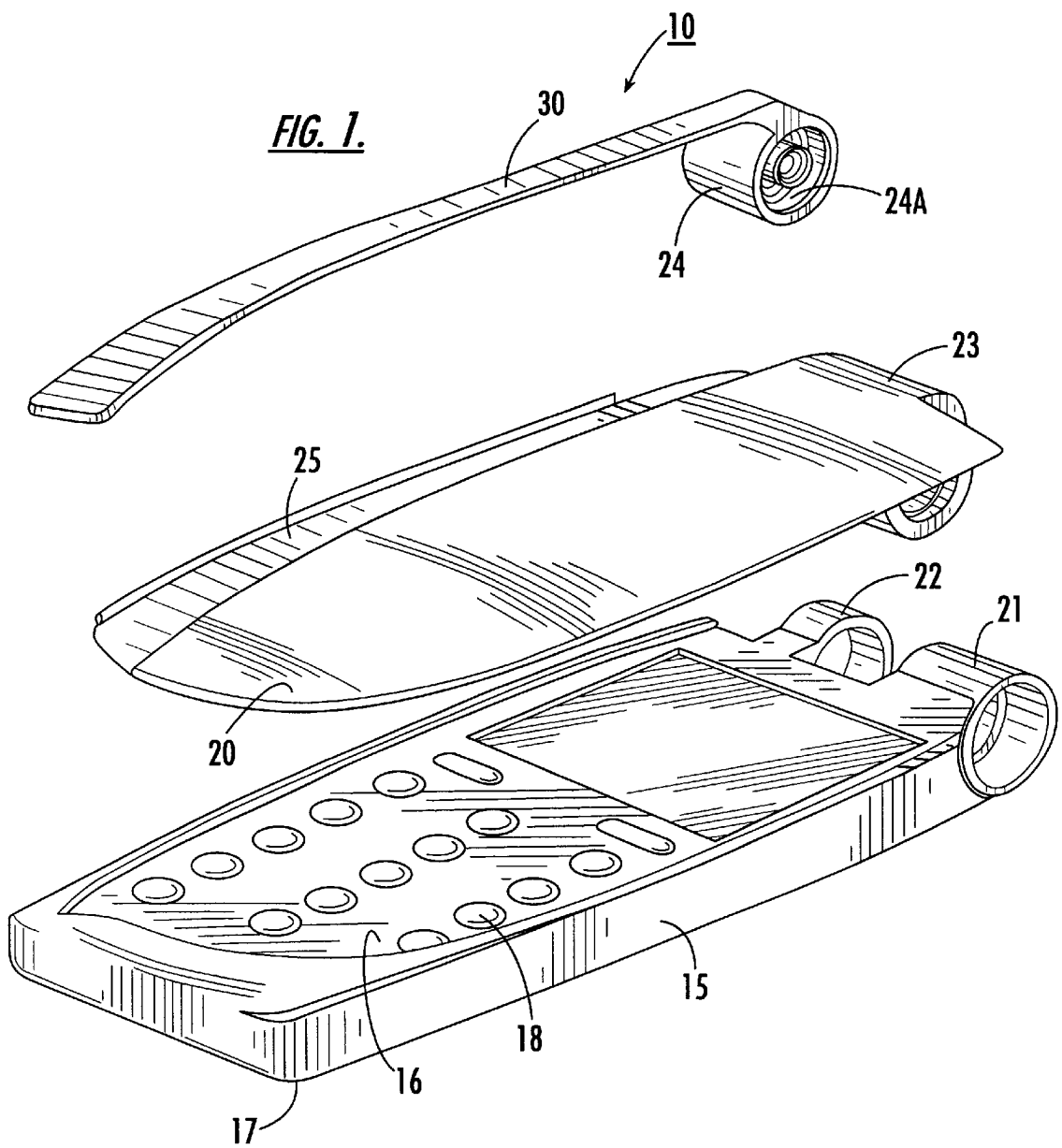
FIG. 1 is an exploded perspective view of a radiotelephone according to the present invention.

Referring now to FIG. 1, a preferred embodiment of a radiotelephone 10 is illustrated. As shown, the radiotelephone 10 includes a radiotelephone body or housing 15, a flip 20, and a strip antenna 30. The radiotelephone body 15 includes top and bottom surfaces 16, 17 with a user interface portion 18 on the top surface 16. As shown in FIG. 1, the radiotelephone body 15 also preferably includes hinging portions 21, 22 (alternately shown as 221, 222 in FIGS. 10 and 16) on a top or front edge portion of the housing 15. In a preferred embodiment, the flip 20 and the strip antenna 30 are each separately pivotably mounted to the hinging portions 21, 22 on the top edge of the radiotelephone body 15. As such, the flip 20 includes a flip hinge 23 and the strip antenna 30 includes a strip hinge 24. The hinges 23, 24 are sized and configured to align and pivotally mate with the corresponding stationary hinging portions 21, 22 on the radiotelephone body 15, as will be discussed further below.

Figure 2:
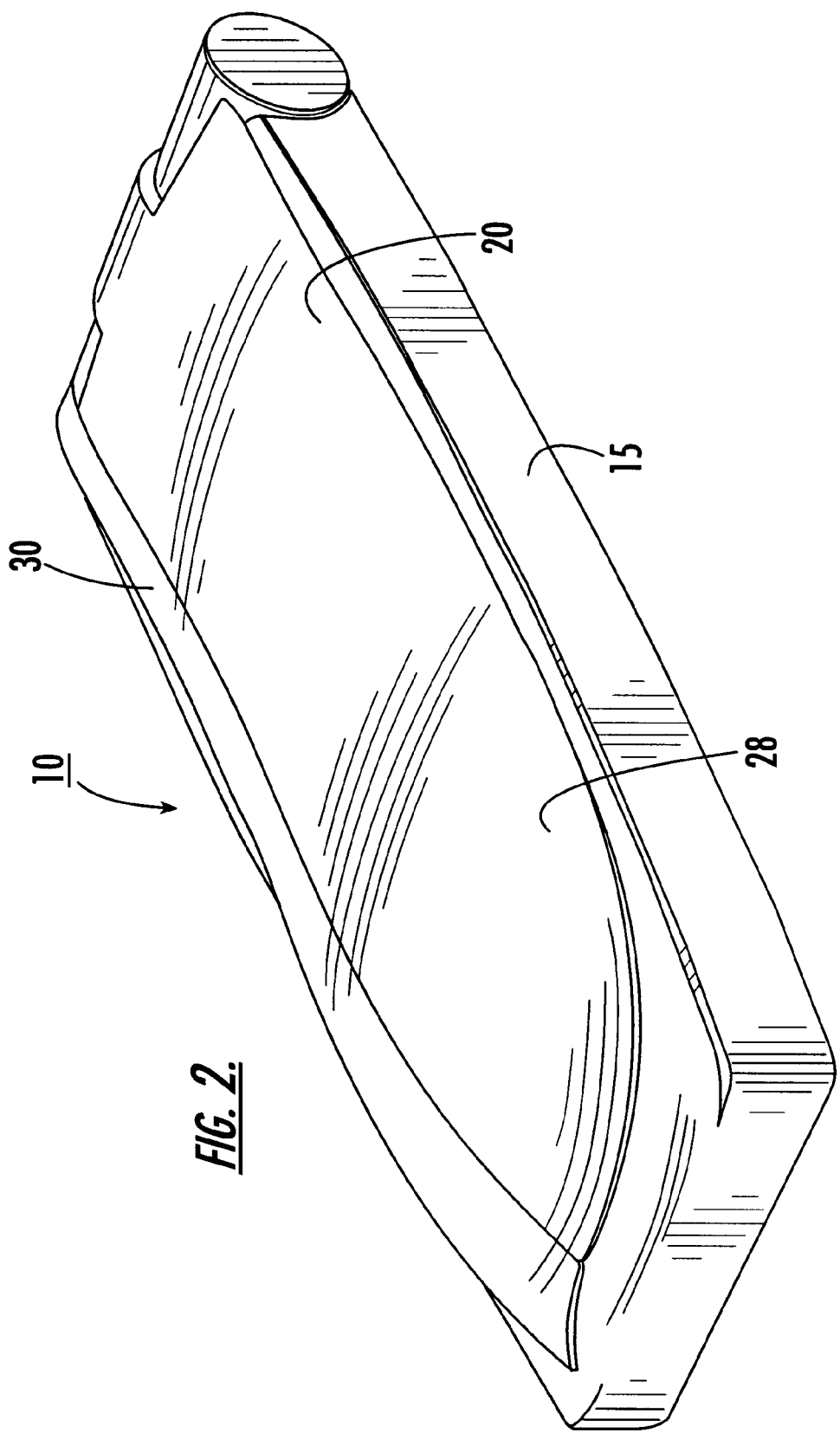
FIG. 2 is a perspective view of the radiotelephone of FIG. 1 with the flip and strip antenna in a closed or stow position.

Referring again to FIG. 1, in this preferred embodiment, the flip 20 is configured with a recessed portion 25 which is configured to receive at least a portion of the length of the strip antenna 30, and preferably a major portion of the length of the strip antenna, when the strip antenna 30 and flip 20 are in the stow or closed position. As such, as shown in FIG. 2, in operation, the flip 20 and strip antenna 30 rotate to matably engage and preferably define a continuous outer cover 28 with an aesthetically desirable arched profile which overlays the top surface 16 of the radiotelephone body. Preferably, the cover 28 securely and releasably attaches to the radiotelephone body 15.

Figure 3:
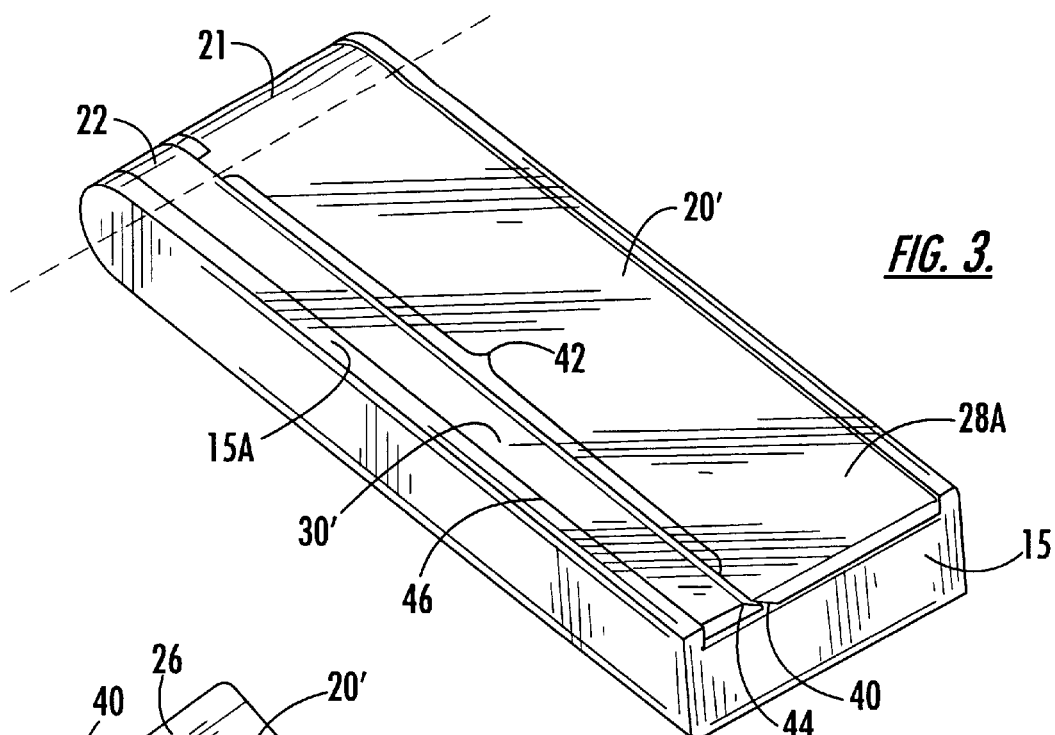
FIG. 3 is a perspective view of an alternate embodiment of a strip antenna and flip attached to a radiotelephone with a coaxial hinge arrangement according to the present invention.

FIG. 3 illustrates an alternate preferred embodiment of a strip antenna 30' and flip 20'. As shown, this embodiment includes a side-by-side or adjacently configured flip 20' and strip antenna 30'. As shown, the hinge mounting structure is coaxial. Stated differently, the flip hinge pivots relative to a flip hinge axis 60 and the antenna pivots relative to an antenna hinge axis 70. In this embodiment, the flip hinge axis and the antenna hinge axis are coaxial.

Figure 4:
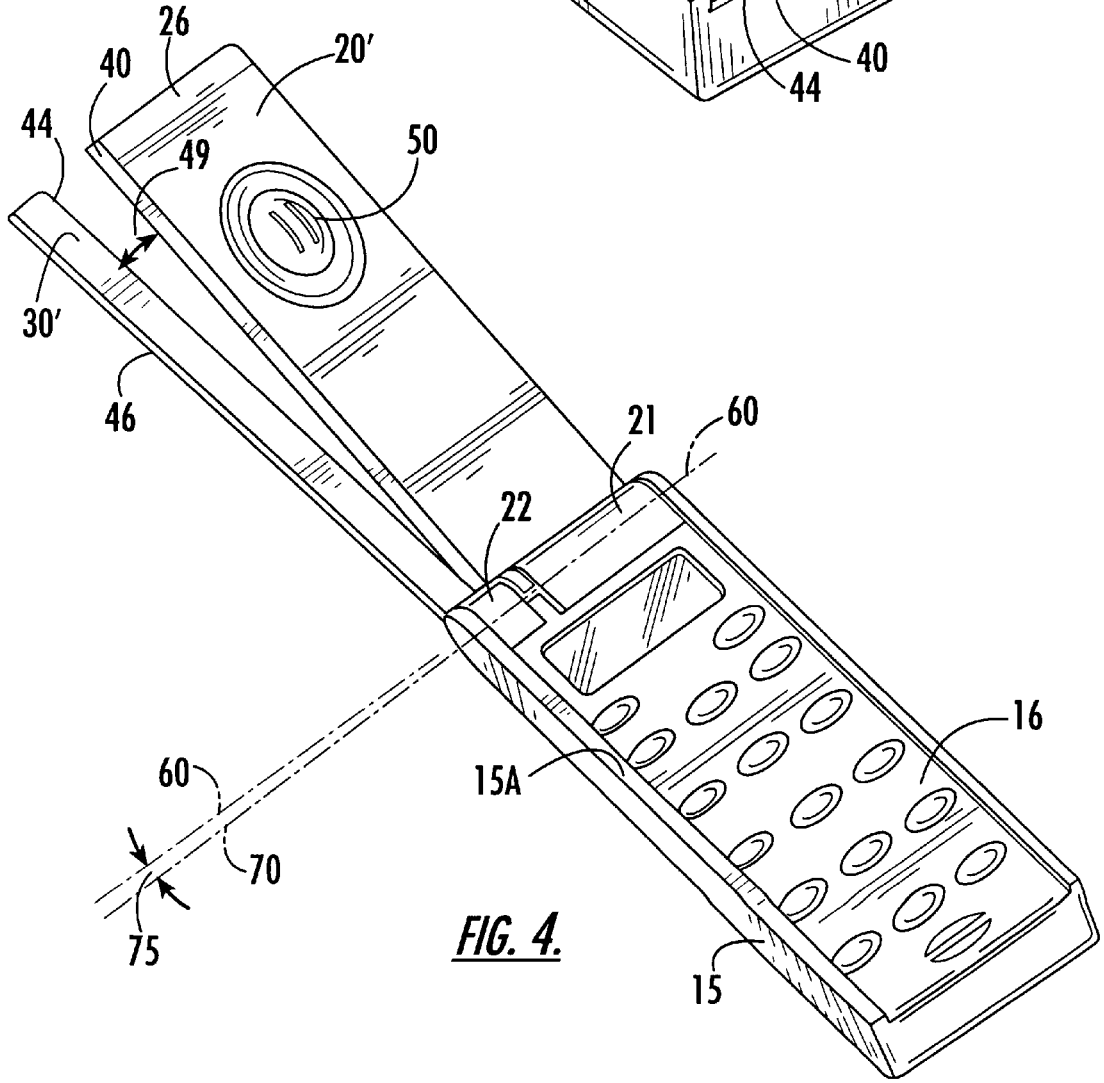
FIG. 4 is a perspective view of a radiotelephone of the present invention in an open position and with a non-coaxial hinge arrangement.

Similar to the embodiment of FIGS. 1 and 2 discussed above, the flip 20' is configured to trap at least a portion of the adjacently positioned antenna 30'. As shown in FIG. 4, the side of the flip 20' adjacent the antenna 30' is configured with a slight undercut 40. The undercut 40 preferably runs along a major portion of the length of the flip 20' and defines a strip antenna contact edge portion 42 which matably engages with an adjacent strip antenna side or lateral portion 44 when the antenna 30' and flip 20' are closed. Preferably, as shown in FIG. 3, the adjacent strip antenna side portion 44 has a beveled edge which is sized and configured to securely abut and rest against the undercut of the flip 40 when in the stow position. Thus, the strip antenna side portion 44 is effectively captured and held by the substantially rigid undercut 40. It is also preferred that the opposing side 46 of the strip antenna 30' (the side away from the flip 20') is configured to firmly abut and rest against a raised projection 15A on the radiotelephone housing 15 such that the strip antenna 30' is sandwiched between the flip 20' on one side and the raised area of the housing 15 on the other. Advantageously, this raised projection 15A can serve as an edge protector for the antenna 30'. This configuration also preferably defines a substantially continuous cover 28A when the radiotelephone is in the closed or stow position. Stated differently, the outer surface of the radiotelephone is aesthetically configured to minimize any gap between the strip antenna 30' and the flip 20' in the closed position. Of course, as will be appreciated by those of skill in the art, other flip and antenna shapes and configurations can also be employed within the scope of the present invention.

It is also preferred that the flip 20' and or antenna 30' be configured to releasably lock against the body of the radiotelephone 15 when in the stow position. For example, the end 26 of the flip opposite the hinges 23, 24 can be configured to snap into a locking recess formed in the radiotelephone body (not shown). The locking recess can be formed by configuring the top surface of the radiotelephone with a cutout or recess matching the shape of the tip of the strip or blade (not shown), and preferably includes a co-molded thermoplastic elastomer (TPE) lining to facilitate a firm and secure closing. Alternatively, other additional locking configurations or mechanisms can be used to secure the cover or the flip or antenna to the housing in the closed position. For example, the cover can be configured with a front or side extension, such as a tapered pin, which engages with a spring loaded catch or which is spring loaded itself (not shown) to releasably engage the housing when the cover 28A is closed and can easily release when the flip 20 (and/or antenna) rotates away from the radiotelephone body.

FIG. 4 illustrates a radiotelephone like that of FIG. 3 in an open position, but with a differently arranged mounting structure. In this preferred embodiment, the antenna hinge axis intersects the flip hinge axis at an intersection point along the radiotelephone body. The angle of intersection or offset 75 is preferably about three degrees. Stated differently, the two axes of rotation extend across the radiotelephone surface such that they intersect at an intersection point (or are configured such that one axis approaches the other such that they nearly intersect) along the radiotelephone body. Thus, the offset or non-coaxial mounting arrangement allows the deployed strip antenna 30' and flip 20' to separate while allowing for the strip antenna 30' and flip 20' to come together when closed over the housing. Therefore, because the radiotelephone preferably includes two hinges (i.e., a dual hinge design), one each for separately pivoting the strip antenna and the flip 22, 21, respectively, the strip antenna 30' can be positioned spaced-apart from the flip 20' in the open position. Advantageously, the separation can allow the antenna 30' to be positioned in such a way as to minimize the potential interference associated with the anatomy of the user. Any of the hinge or pivot configurations also apply to other strip antenna and flip shapes such as the flip 20 and strip antenna 30 shown in FIG. 1.

Figure 5:
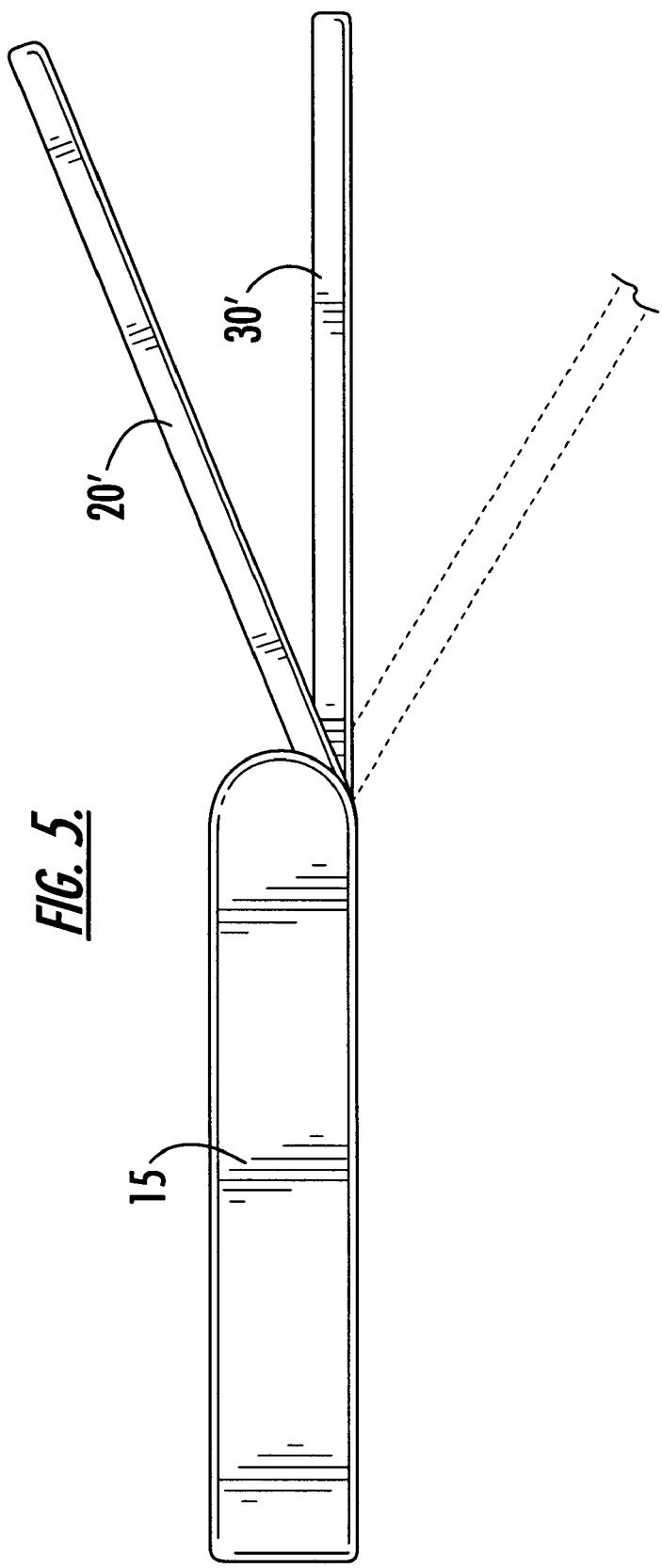
FIG. 5 is a side view of a radiotelephone according to the present invention showing the strip antenna opening to a greater angle from the radiotelephone body than the flip.

For example, as shown in FIG. 4, the flip 20' includes a speaker 50 which is typically positioned adjacent the ear of the user during standard operation. Absent such a dual hinge configuration, the antenna 30' would typically rotate concurrently with the flip 20' and be positioned proximate to the user's head. Configuring the strip antenna 30' such that it is free to rotate separate from the flip 20' allows the strip antenna 30' to be spaced-apart at the longitudinal end of the antenna 49 and also rotate to a greater angle away from the flip 20' (and thus the user) (FIG. 5). This configuration advantageously minimizes the interference associated with the user and can improve the sensitivity of the radiotelephone.

In a preferred embodiment, as shown in FIG. 5, the strip antenna 30' opens to a greater angle (travels through a greater angle of rotation as it moves from the stow to the open position) than the flip 20' relative to the axis of rotation defined with respect to the radiotelephone body. Preferably, the antenna 30' opens about 30–60 degrees or more preferably about 35–50 degrees greater than the flip 20' in the fully open position. As noted above, the separation provided by the increased movement of the antenna 30' relative to the flip 20' can minimize interference associated with a user. In a preferred embodiment, as shown in FIG. 5, the strip antenna 30' opens to rotate about 210 degrees from the closed position while the flip 20' rotates to about 160 degrees relative to the axis of rotation. This provides an angular separation or clearance of about 50 degrees between the antenna and flip when both the flip 20' and antenna 30' are in the (fully) open or active operative position. In an additional preferred embodiment (as shown in phantom in FIG. 7) the antenna 30' is positioned at about 210 degrees from the radiotelephone body. In this embodiment, it is also preferred that the flip 20' be positioned at about 180 degrees from the radiotelephone body (not shown). This provides an angular separation between the flip 20 and antenna 30 of about 30 degrees when both are in their respective open positions. Additional information including preferred and suitable hinge configurations and antenna couplings can be found in co-assigned and co-pending patent applications identified by U.S. patent application Ser. Nos. 09/217,142, and 09/217,049. The contents of these applications are hereby incorporated by reference as if recited in full herein.

Flip Assembly

Figure 8:
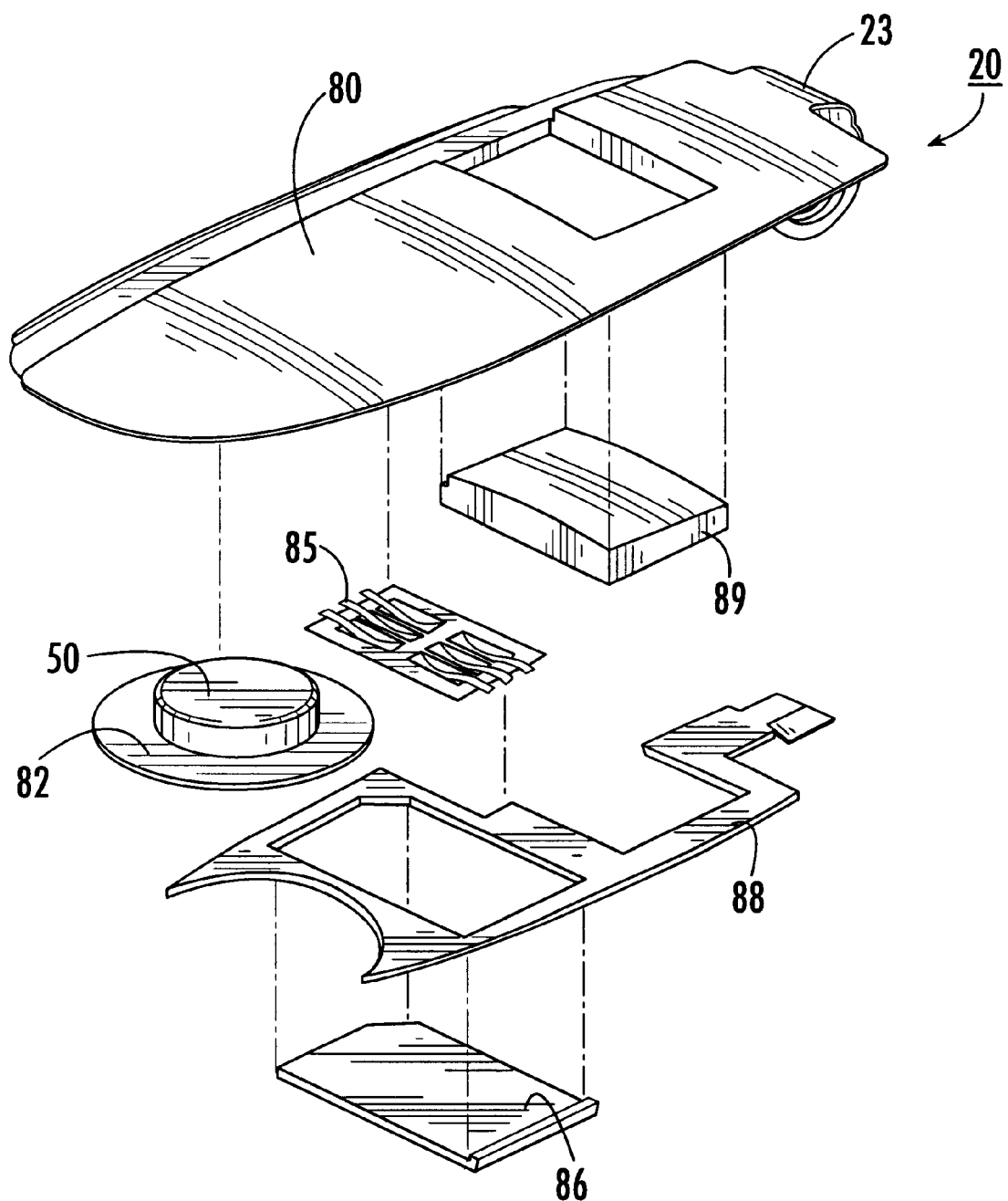
FIG. 8 is an exploded view of a flip assembly according to the present invention.

As discussed above, the flip 20 includes a speaker 50 positioned such that it is easily accessible by a user in operation (when open). FIG. 8 illustrates a preferred embodiment of a flip assembly 20 according to the present invention. As shown, the flip assembly 20 includes a substantially rigid housing 80, a speaker 50, an associated diaphragm 52, a SIM card frame 85, a SIM card door 86, and a window 89. Generally stated, the assembly components are attached to the housing 80 and held in place by a flip cover 88. The assembly can also include a flex circuit such as that designated at 230 in FIG. 10.

Blade/Strip Antenna

Figure 6:
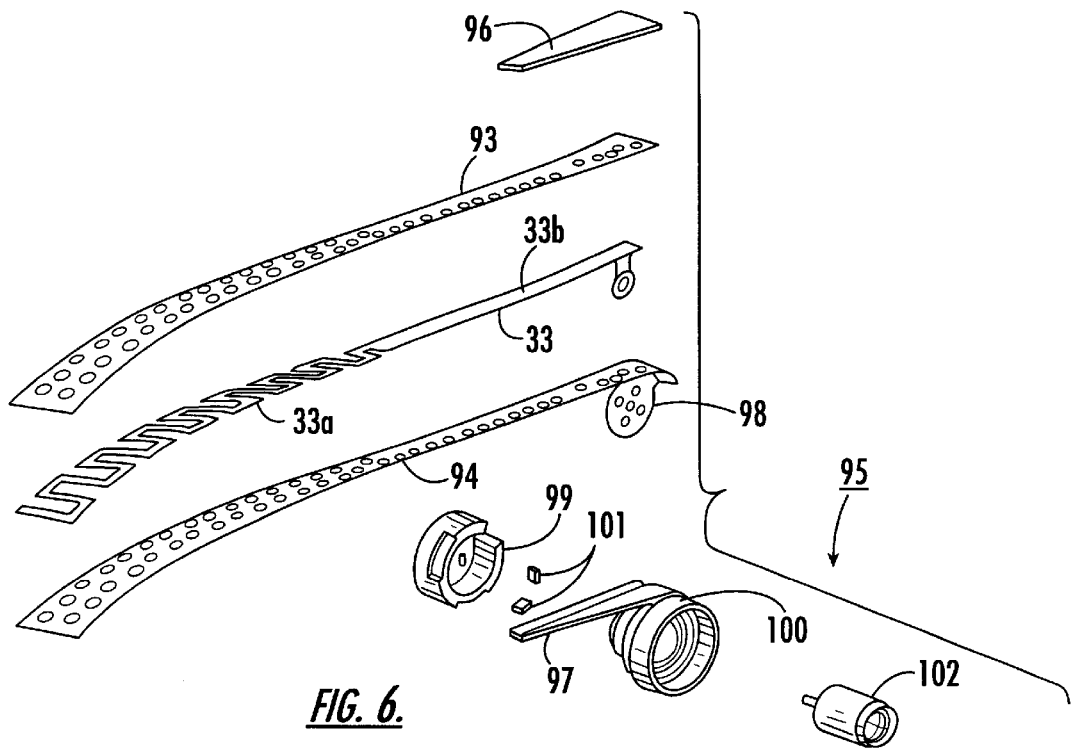
FIG. 6 is an exploded perspective view of a strip antenna according to the present invention.

FIG. 6 shows a preferred embodiment of a flexible strip antenna 30 according to the instant invention. It is preferred that the antenna 30 have a high degree of flexibility in order to decrease the size of the radiotelephone mounting structure over that typically needed to handle loads encountered in conventional blade antennas. The higher loads can be attributed to the conventional blade's limited stiffness. By utilizing highly flexible strip antenna structures, the radiotelephone mounting structures can be reduced in size and weight. The reduced size and weight are particularly desired features in portable devices and are even more particularly desired with "pocket phones."

Accordingly, the instant invention preferably includes a flexible substrate for the radiating electrical element 33. More preferably, the substrate is formed of a superflexural Ni—Ti (a highly flexible alloy). Alternatively, other materials could be used as the radiating element, such as, but not limited to, copper or beryllium alloys, foil, and the like. In one embodiment, the radiating element is formed from 0.35–0.4 mm diameter Ni—Ti wire or 0.10–0.30 mm thick sheet. For example, the element is formed from 0.14 mm thick wire Raychem Tinel™ B—B material arranged in a substantially planar square wave pattern 33a (or meander pattern) which terminates to a linear pattern 33b along the length of the strip antenna 30. As the strip or flat blade antenna 30 preferably has a minimal thickness, mechanical strength and durability is therefore preferably provided by proper selection of materials in order to yield a functional flexible radiating electrical structure. In a preferred embodiment, as shown in FIG. 6, the radiating element 33 is sandwiched between nylon cloth or screen layers 93, 94 which are typically attached to the radiating element via a compression molded thermoplastic elastomer (TPE) which fills and overcoats the structure. A retainer 96 can also be used to overlay a portion of the top nylon layer 93 to provide additional structure. In one embodiment the retainer 96 is manufactured from a molded type 6 nylon and is bonded with a urethane adhesive to the outer surface of the top layer 93 prior to overmolding.

In a preferred embodiment, the radiating element 33 is covered with an open nylon cloth or screen and bonded with a TPE overmold. Preferably, TPE is also pushed through the cloth openings during molding, creating a suitable mechanical structure. The nylon cloth outer layer is preferably overmolded (via compression molding) with a thermoplastic elastomer (TPE) such as Santoprene™ type 101-80A. The nylon melts and bonds to the elastomer overmold thereby forming a suitable flexible mechanical structure able to resist repeated bending. Alternately, a primer layer of TPE may be applied prior to molding (not shown). Preferably, the thickness of the layers 33, 93, 94 are sized and formed to prevent the bending strain in the radiating element 33 (such as in the Ni—Ti alloy) from exceeding about 10% and more preferably about 8% of the ultimate strain. This design parameter can reduce the potential of material yield and the potential for permanent set which can occur when the antenna is subjected to mechanical abuse.

Alternatively, a flex circuit element can be used (not shown). In this embodiment, a flex circuit having about 0.15 mm nominal thickness can be used with nylon mesh reinforcement protective layers as described above. Again, the antenna is preferably compression molded to provide an overmolded antenna element. Optionally, the flex circuit can be molded without the nylon layers. See co-pending and co-assigned U.S. Patent Applications entitled, "Flexible Strip Transmission Line," "A Rigid and Flexible Flat Antenna," and "A Termination Contact For An Antenna With a Nickel-Titanium Radiating Element," identified by U.S. patent application Ser. Nos. 08/798,137, 09/017,660, U.S. Pat. No. 6,061,036, and Ser. No. 09/017,658, U.S. Pat. No. 6,046,708 respectively, the disclosures of which are hereby incorporated by reference as if recited in full herein.

Biasing Structure

The blade antenna is preferably mounted to the radiotelephone via a biasing structure configured such that the antenna is biased to travel toward the open position during deployment. In a preferred embodiment, the biasing structure is configured to increase the rotational force transmitted to the blade antenna at or beyond a predetermined angle in the opening direction and in the closing direction. It is further preferred that the biasing structure is configured to bias the blade antenna to travel beyond or rotate through a greater angle of rotation than the flip member to position the blade antenna away from the flip member in the open position.

Figure 9:
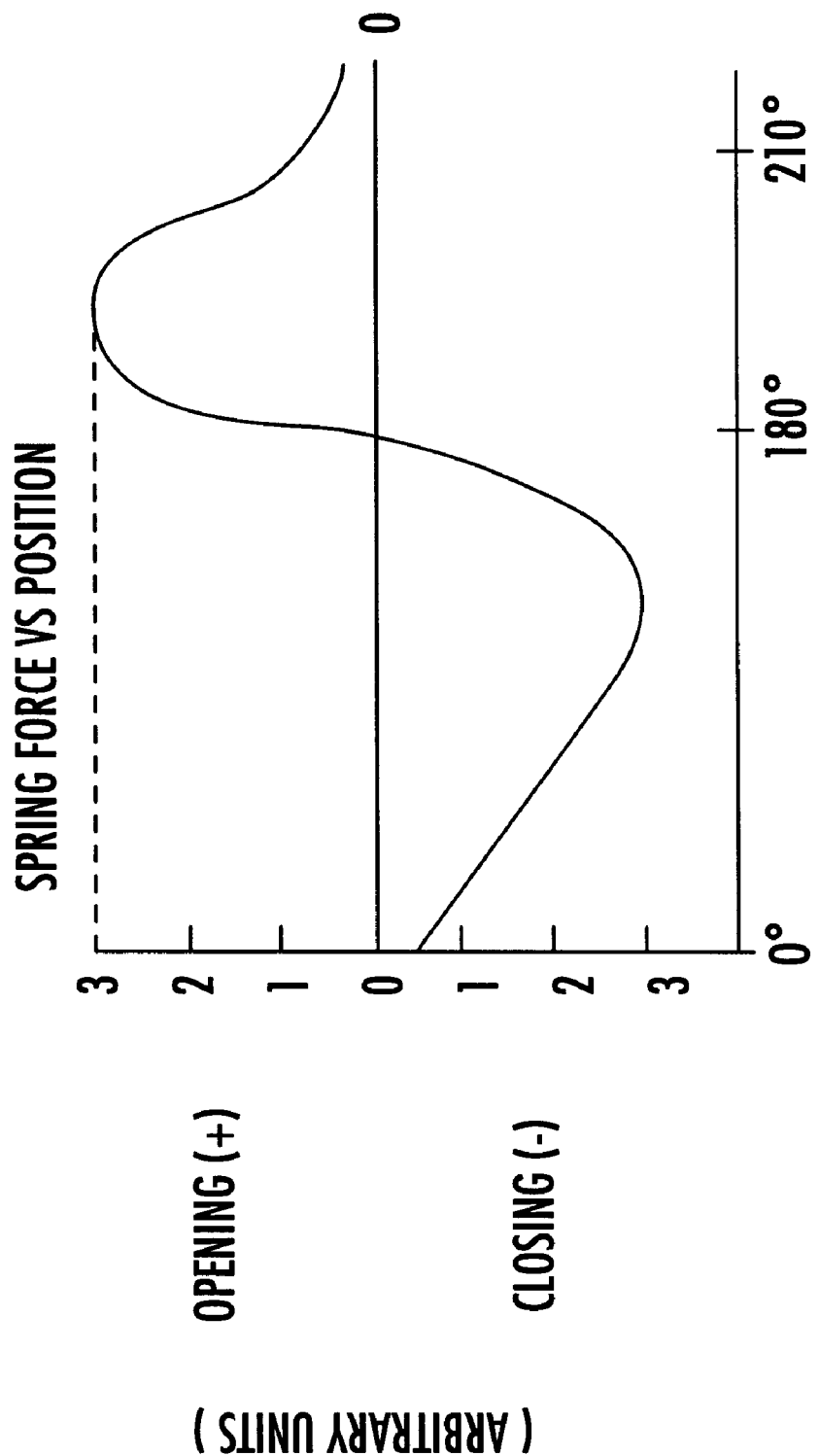
FIG. 9 is graphical representation of preferred force loading as a function of rotation angle on an antenna according to the present invention.

As shown in FIG. 9, the biasing structure of the present invention is preferably configured to provide a variable spring force which, in turn, provides a variable rotational force or torque vector introduced on or transmitted to the blade antenna 30. The rotational force corresponds to the angle of rotation of the antenna. In a preferred embodiment, during opening, the spring force associated with the biasing structure introduces first increasing and then decreasing rotational forces onto the antenna. Preferably, the biasing structure is configured to give maximum rotational assistance to the antenna at about just above 180 degrees during opening and at about just below 180 degrees during closing. During opening, as shown in FIG. 9, the detent spring force (and thus the corresponding rotational force vector) substantially follows a parabolic pattern, i.e., it increases rapidly from about 180 degrees through about 195 degrees and then falls rapidly to about zero at 210 degrees. Similarly, the closure force increases and then decreases to substantially follow a ramp pattern, i.e., the force vector rapidly rises from about 180 degrees to about above 90 degrees and then linearly falls to about zero at closure. Of course, the force pattern can be adjusted to fit other open positions as will be appreciated by those of skill in the art.

As used herein, the term "biasing structure" comprises mounting structures, radiotelephone body or frame configurations, and components which are positioned in or proximate to the hinging portion of the radiotelephone and blade antenna such that the blade antenna translates or rotates about the radiotelephone toward certain open and stow positions with lesser external (user) forces because of the operation or functional assistance of the biasing structure. Stated differently, as used herein, the term "biasing structure" includes mounting configurations, frame structures, and components which allow pivotable attachment of the blade antenna about the radiotelephone in a manner which assists in the movement of the antenna toward preferred open and closed positions by increasing internally transmitted forces to the antenna; the internally transmitted forces are associated with the rotational position of the antenna. In a preferred embodiment, as will be described further below, the biasing structure 400 comprises a detent cam (shown at 105, FIG. 10, and 284, FIG. 15) and detent spring (shown at 103, FIG. 6, and 282, FIG. 15) which are configured and attached to the radiotelephone frame and operably associated with the blade antenna 30 to bias movement of the antenna in two directions, i.e., toward the open position and the stow position.

In operation, a user disengages the blade antenna 30 from its stow position; as the antenna 30 advances toward a predetermined position away from the stow position, the force vectors increase and pre-dispose or bias the antenna to rotate to open toward a position which is greater than about 180 degrees from the stow position (zero degrees being the position overlaying the radiotelephone input surface). As will be discussed further below, in a preferred embodiment, as the antenna opens and rotates beyond about 180 degrees, the detent spring 103 (FIG. 6) is trapped against the increased cam surface (as shown by 105A in FIGS. 10, 11A, 11B) (the cam surface rises and is formed from an inclined ramp defining the operative face of the cam) and the antenna, causing the detent spring 103 to be compressed and increasing the force exerted against the antenna. This action biases the antenna to open toward a desired operative position and to extend in the longitudinal direction away from the stow position and preferably away from the flip member. This biasing can help assure proper operational position and separation of the antenna from the flip to minimize interference with the user. Similarly, in reverse (upon closing) as the antenna rotates past about 180 degrees in the closing direction, the internally transmitted closing forces increase until the antenna reaches a predetermined position, biasing or causing the antenna to move or translate toward the radiotelephone stow position. The increased forces internally introduced onto the blade antenna caused by the biasing structure reduce the force a user needs to exert on the antenna and assist the translation of the antenna into toward desired open and closed positions.

Preferred Mounting Structures

A. Antenna with Stationary Cam

Referring again to FIGS. 6 and 7, a preferred embodiment of an antenna mounting structure 95 is also shown. The bottom outer layer 94 preferably includes an extending portion 98 which is connected to a molded shell 100. The molded shell 100 preferably includes a bottom retainer portion 97 which, in position, will preferably lie underneath the upper retainer 96 and contact the bottom surface of the lower layer 94. As such, the upper retainer 96 and bottom retainer portion 97 attach the lower portion of the antenna to the shell 100. The antenna mounting structure 95 also preferably includes an end cap 99, circuit matching components 101, a rotary male RF connector 102, and a (detent) spring 103.

Figure 7:
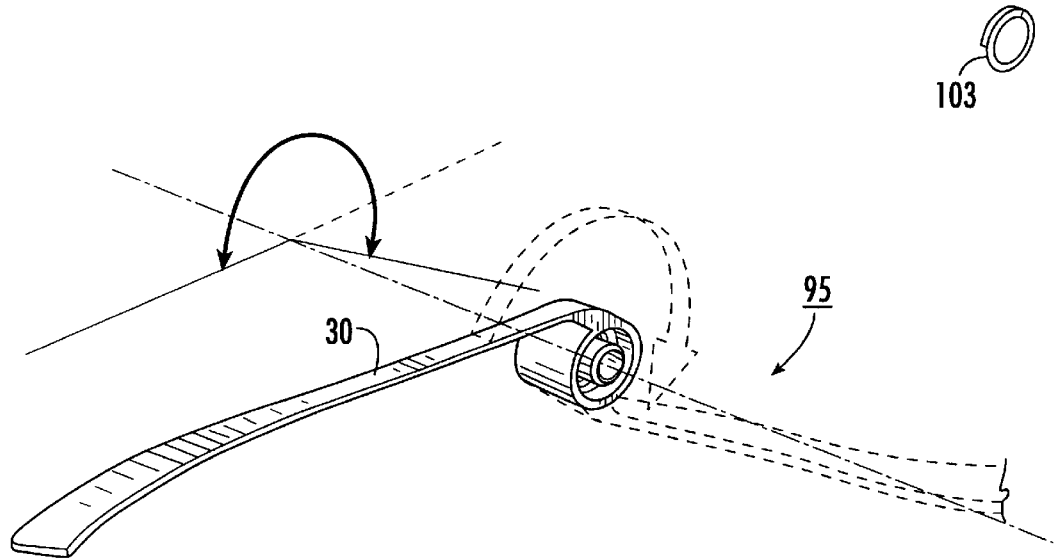
FIG. 7 is a perspective view of the antenna sub-assembly of FIG. 6.
Figure 10:
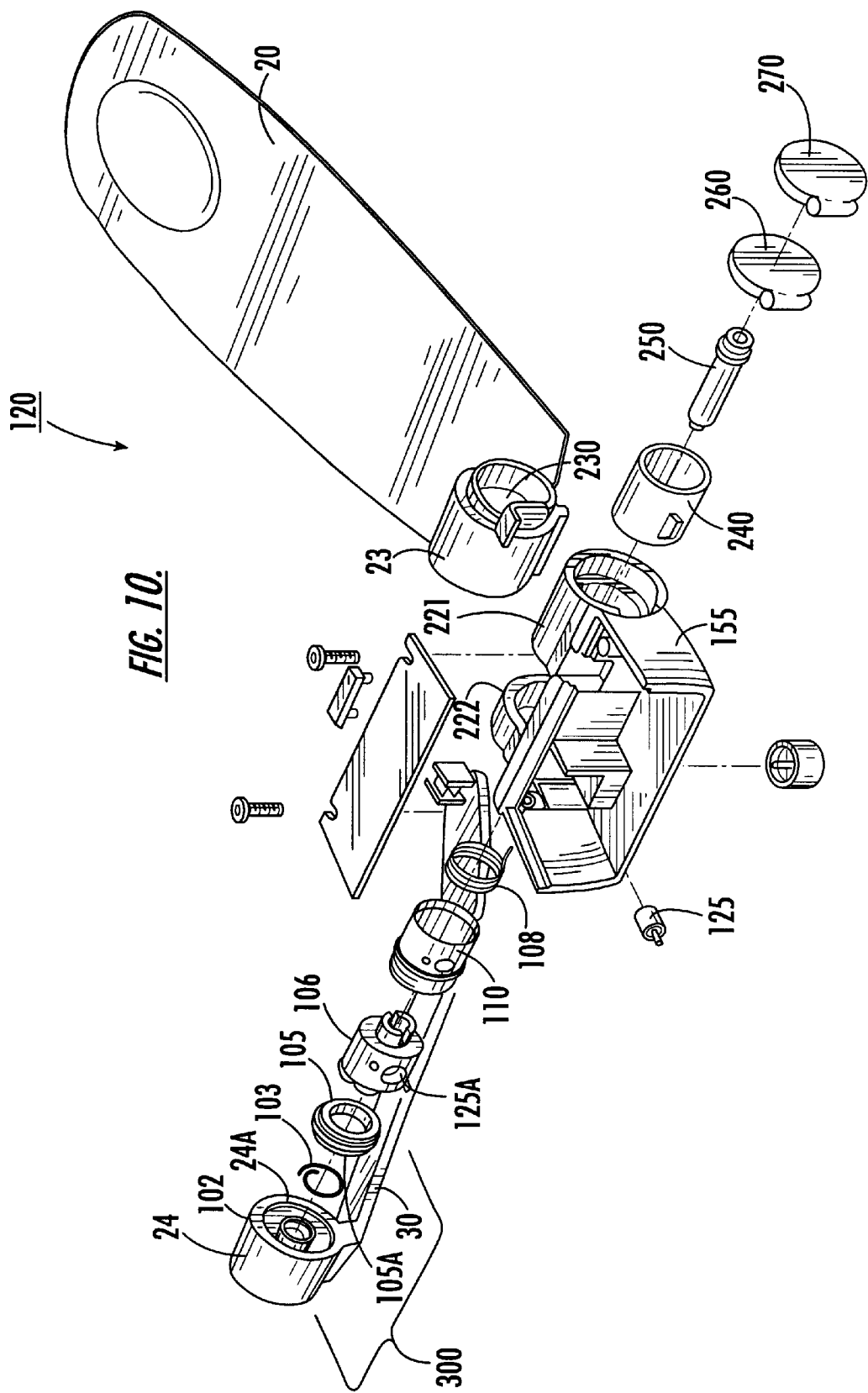
FIG. 10 is an exploded view of a flip and antenna and hinge assembly according to the present invention.

FIG. 7 illustrates the mounting structure 95 of FIG. 6 partially assembled with the antenna 30. FIG. 7 also shows preferred opening and closing positions of the antenna 30 with respect to the axis of rotation (i.e., 0 degrees at closing and 210 degrees at fully open). FIG. 10 additionally illustrates a detent cam 105 and a female RF connector 106 according to a preferred mounting structure of the antenna. The detent cam 105 and RF connector 106 are mounted to the frame designated at 155 in FIG. 10 of the radiotelephone. The male RF connector 102 is inserted into the female RF connector 106. The female connector is operably associated with a RF feed 125 (FIG. 10) that connects to the circuitry of the radiotelephone. FIG. 17B illustrates a preferred configuration of a rotatable detent spring 103. As shown in FIGS. 11A and 11B, the free end of the spring 103A transversely extends to contact the cam 105. The fixed end of the spring 103B is positioned proximate to the antenna shell. In a preferred embodiment, the detent spring 103 is sized and configured to reside in a slot formed in the molded housing of the antenna shell (not shown).

In operation, the (detent) spring 103 and the sub-assembly 300 rotate in response to a user activating the radiotelephone and extending the antenna 30, while the RF connector 106 and detent cam 105 remain stationary. The male RF connector 102 is sized and configured to abut and rest against the walls of the female RF connector 106. As such, the inclined surface of the cam 105A acts to push and compress the spring 103 against the antenna as the spring 103 rotates against the certain portions of the cam surface (i. e., the surface portion with the inclined ramp or projection (shown at 105A' in FIG. 17). In turn, the increased spring force pushes against the antenna hinge portion 24, increasing the spring force and the rotational force vector transmitted to the antenna 30 associated with the rotation of the antenna.

B. Antenna and Flip Hinge Assembly

FIG. 10 shows an exploded view of a preferred embodiment of a flip 20 and strip antenna hinge assembly 120 of the instant invention. The radiotelephone body 15 preferably includes a frame end piece 155 which is positioned such that it defines the end portion of the radiotelephone body 15. The frame piece 155 preferably includes a pair of spaced-apart frame bosses 221, 222. The space between the bosses 221, 222 is sized and configured to receive the mating portion of the flip hinge 23. The frame 155 also receives the RF feed 125 and positions the feed 125 such that it is proximate to the RF signal path associated with the antenna 30. The female RF connector 106 is fixedly positioned in the frame 155 such that the RF feed 125 is inserted into the RF feed aperture 125A in the female RF connector 106. As such, the antenna RF signal path is defined by the radiating element 33 in the antenna 30 electrically connected to the male RF connector 102, which engages to the RF female connector 106, which in turn contacts the RF feed 125. The RF feed 125 is operably associated with the operating circuitry of the radiotelephone (i.e., the printed circuit board disposed inside the radiotelephone body 15) (not shown).

Referring again to FIG. 10, to assemble the pivotable flip 20 and antenna 30, a load spring 108 and flex circuit 230 are preferably inserted into the cavity in the flip. The flip hinge 23 is then positioned between the frame bosses, 221, 222. Bearing retainers 110, 240 are inserted into opposing cavities of the frame bosses 221, 222, respectively. The bearing retainers 240, 110 each extend a predetermined distance into the flip hinge 23 cavity. Preferably, the bearing retainers 110, 240 are press-fit into the frame and the adjacent flip cavity. Next, the female RF connector 106 is positioned in the bearing retainer 110 and rotated (to pre-load the load spring 108) and locked into a preferred pre-load position, i.e., abutting the load spring 108. The flex circuit 230 is fed through the bearing retainer 240 and the RF feed 125 is assembled to the frame 155 such that it connects to the RF connector 106. As shown in FIG. 10, a shaft 250 is inserted into the bearing retainer 240 until it engages with the flip hub 251 (FIG. 13) such that it locks inside the flip hinge 23. The shaft 250 extends through the flip and rests against the inner diameter 106A of the RF connector 106. Preferably, the shaft 250 employs a square cut keying feature to lock to the flip hub 251. A damper 260 is positioned on the shaft 250 on the opposing end 250A the RF connector 106. In position, the shaft 250 is supported between the damper 260 and the RF connector 106. An end cap 270 locks the damper 260 in position. The antenna subassembly 300 is positioned over a portion of the bearing retainer 110, with the male RF connector 102 electrically connecting to the female RF connector 106.

Figure 11:
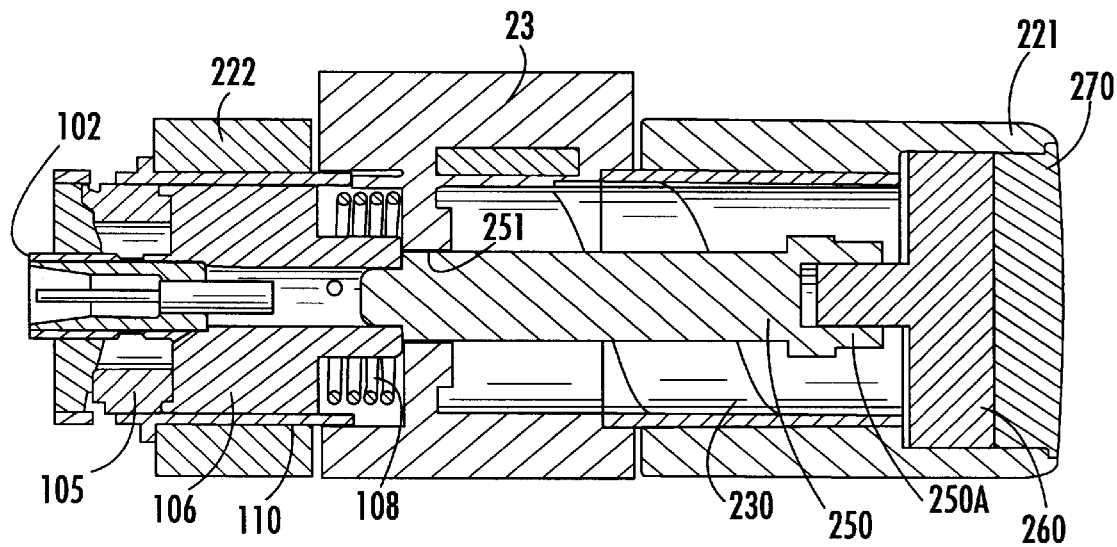
FIG. 11 is a section view of the assembly shown in FIG. 10.
Figure 11A:
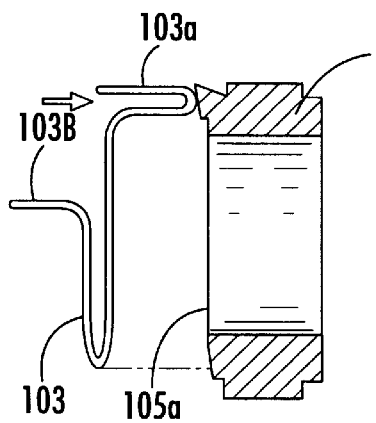
FIG. 11A is an enlarged partial section view of the stationary cam and rotary spring shown in FIG. 10.
Figure 11B:
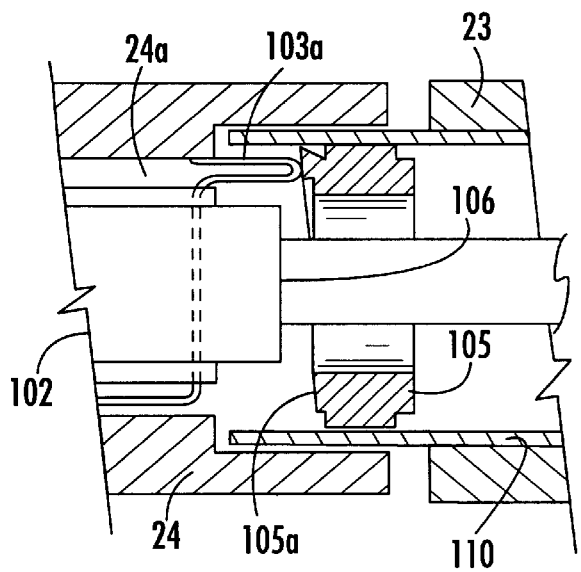
FIG. 11B illustrates the assembled position of the detent spring and stationary cam shown in FIG. 11A.

FIG. 11 is a section view of an assembled flip and antenna hinge assembly of the preferred embodiment shown in FIG. 10 and discussed above. In operation, the flip 20 pivots about the flip hinge portion 23 such that the inner wall of the flip hinge portion rides on the outer surfaces of the two bearing retainers 110, 240. Similarly, the antenna 30 pivots about the antenna-hinging portion 24 such that the inner wall of the shell 100 rides on the outer surface of the first bearing retainer 110.

The detent spring 103 (FIG. 6) is positioned intermediate the cam 105 and the antenna shell such that it rotates with the antenna and rides against the cam face 105A formed on the stationary side of the RF connector interface (male to female). The spring 103 (as exemplified in FIGS. 11A, 11B, 17B), as described above, provides added rotational force(s) at predetermined antenna opening and closing positions to bias the antenna to move beyond the flip 20 or to facilitate one or more of full deployment and closure or positional alignment during operation. The cam surface 105A is preferably formed such that the rotational force vector associated with the antenna changes during flip opening and/or closing.

In a preferred embodiment, the antenna hinge axis is offset from the flip axis as noted above. Preferably, the antenna shell 24A engages with a RF connector 102 in a manner which provides the offset. This can be achieved by increasing the clearance between the antenna body 30 and the bearing retainer 110 to allow the force of the detent spring 103 to create an offset angle.

C. Antenna with Rotating Cam

Figure 12:
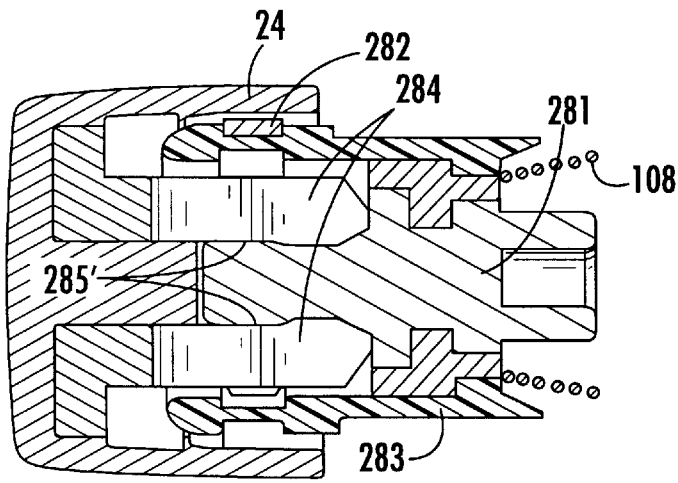
FIG. 12 is a section view of an additional embodiment flip and antenna hinge assembly according to the present invention.

FIG. 12 shows another preferred embodiment of a hinge assembly according to the present invention. The components described above for attaching the flip 20 to the frame 15 are substantially the same in this embodiment. The following description is directed to an alternative preferred antenna mounting structure and can also reconfigure the electrical coupling relative thereto. For example, one type of alternate electrical antenna coupling without a rotating connector is described in co-pending and co-assigned patent application identified by U.S. patent application Ser. No. 09/217,049, entitled "Antenna Electrical Coupling Configurations." The contents of this disclosure are hereby incorporated by reference as if restated in its entirety herein.

Figure 13:
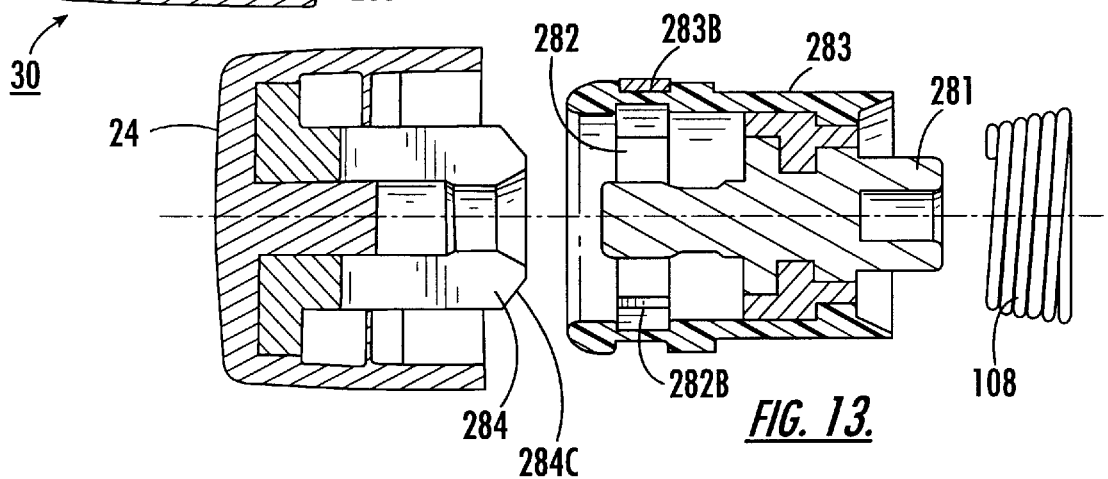
FIG. 13 is an exploded view of the assembly shown in FIG. 12.
Figure 14:
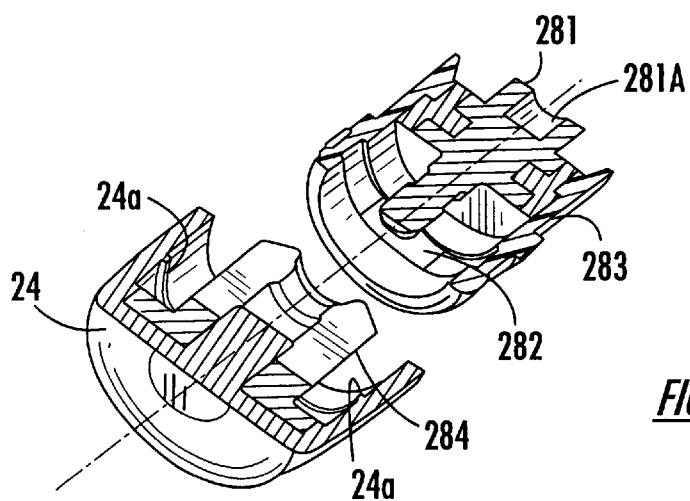
FIG. 14 is an exploded partial section view of the assembled detent cam and bearing retainer assembly and detent spring shown in FIG. 13.
Figure 15:
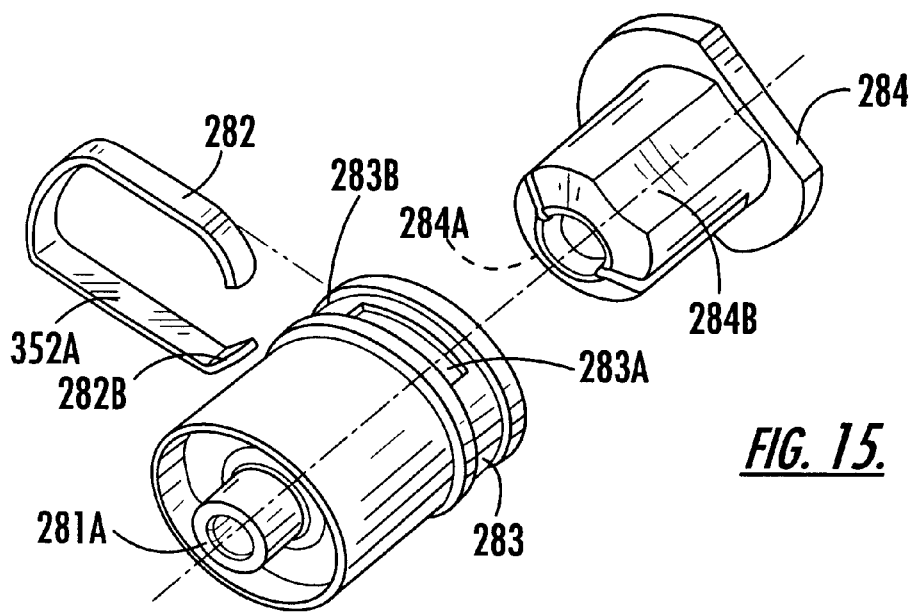
FIG. 15 is an exploded perspective view of the detent cam and spring and bearing assembly shown in FIG. 14.

Referring to FIG. 13, this embodiment includes a detent cam 284, a bearing retainer assembly 283, and a bearing retainer detent spring 282. FIG. 15 illustrates the detent cam 284, separate from the antenna 24, as well as the detent spring 282 separate from the bearing retainer assembly 283. The detent cam 284 has a body with a contoured outer surface which provides a cam surface. The contour is selected such that the antenna will have a tendency to open and close to predetermined positions. As shown in FIG. 15, the body includes two flat or planar segments 284A, 284B which are spaced apart by inclined or curved segments. As shown in FIG. 14, the detent cam 284 is fixedly attached to the shell or hinge cavity 24A of the antenna 30 (bonded, insert molded and the like). As such, the detent cam 284 rotates with extension and retraction of the antenna.

Referring again to FIG. 15, the bearing retainer assembly 283 includes apertures 283A. The detent spring 282 is assembled to the bearing retainer assembly 283 such that the detent spring 282 hugs a portion of the outside wall 283B of the bearing retainer assembly 283. The short portion of the detent spring 282 extends into the inner cavity of the cylindrical bearing retainer assembly 283. As shown in the sectional views of FIGS. 12 and 13, the elongated leg 282A preferably extends across a major portion of the bearing retainer assembly 283, but stops at a distance above the opposing wall. As shown in FIG. 15, the detent spring 282 also includes a foot portion 282B. This foot portion 282B, when assembled, is configured with a clearance between the detent cam 284 outer wall and the inner wall of the bearing retainer assembly 283. In addition, it is preferred that the detent spring 282 be sized and configured to pre-load the spring. Upon assembly, the detent cam front surface 284C pushes the detent spring 282 apart. Thus, this insertion pushes the spring leg 282 open so that the detent spring is under tension, i.e., "is pre-loaded." In operation, the detent spring 282 rides against the detent cam outer surface profile 284A, 284B to provide the force differential associated with antenna actuation. Preferably, the detent spring is formed from 17-7 stainless steel (about 0.4 mm thick) which is tempered or hardened according to standard treatment. Other materials can also be used, including, but not limited to, beryllium copper and the like. It is also preferred that the detent cam 284 be formed from molded acetal resin Delrin™.

As shown in FIGS. 12, 13, and 14, the bearing retainer assembly 283 also includes a shaft 281 which is affixed to the bearing retainer. The bearing retainer assembly 283 and the internal shaft 281 are stationary when positioned in the frame. The shaft 281 includes a receiving opening 281A for supporting the damper shaft 250 as discussed in the first embodiment above. Referring to FIG. 12, upon assembly, the detent cam 284 is inserted into the antenna cavity 24A and fixed to the antenna 30. The internal shaft 281A of the bearing retainer assembly 283 (with the inserted detent spring 282 in place) is positioned in the antenna cavity 24A (FIG. 14) such that the internal shaft 281 is held by the internal walls 285 of the detent cam 284. Preferably, the inner shaft 281 is made of polished stainless steel; the detent cam inner wall rides on this shaft. The wall of the shell or cavity is positioned over the bearing retainer 283 so that the wall surface rides on the bearing outer wall as the antenna rotates. Preferably, the bearing retainer outer wall is formed from a cast or turned brass outer shell and the inner shaft 281 is attached to the outer shell via bonding, insert molding, brazing, welding, or other attachment means.

Figure 16:
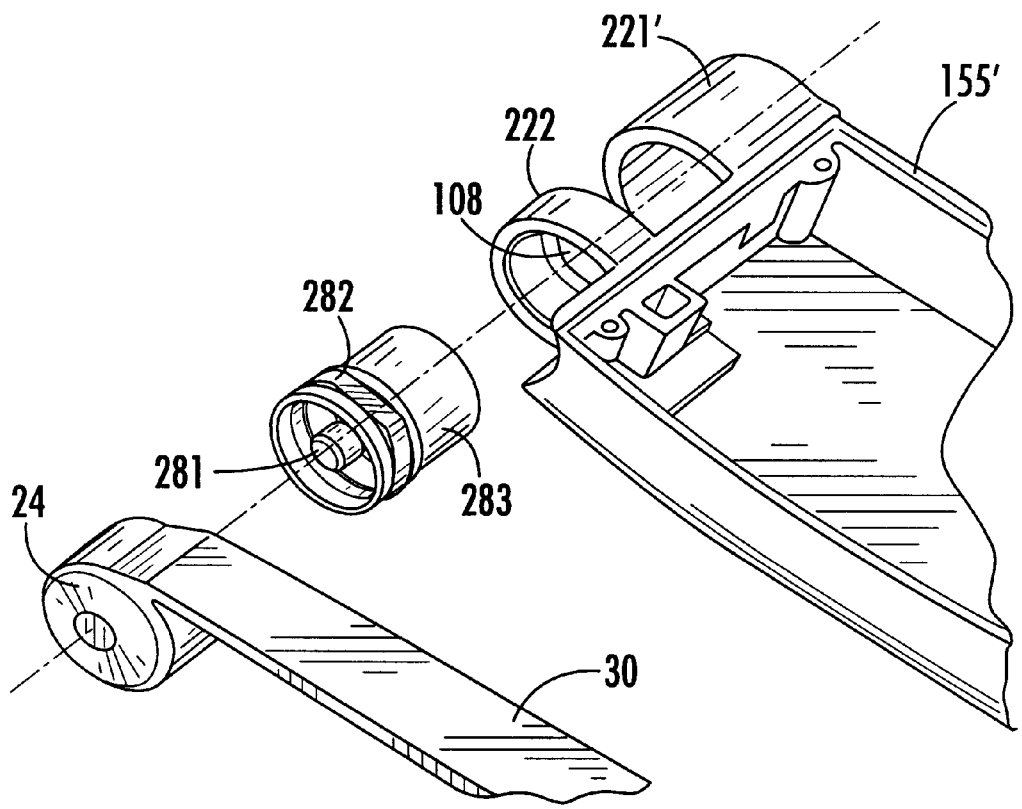
FIG. 16 is an exploded view of the bearing assembly of FIG. 12 shown relative to a radiotelephone body.

The opposing end of the internal shaft 281A is positioned in the radiotelephone such that it captures the damper shaft 250 (FIG. 11). As shown in FIG. 16, the bearing retainer assembly is preferably press-fit into the radiotelephone housing 155' (hinge portion 222) such that the flip hinge 23 rides on the outer surface thereof. The load spring 108 is preferably positioned intermediate the bearing retainer assembly 283 and the flip hinge portion 23. Preferably, the force or loading of the flip 20 and antenna 30 are independent. As such, the detent spring/cam 284, 282 provides the loading for the antenna, while the main spring 108 and flip mounting arrangement provides the loading for the flip 20.

It is also preferred that the bearing retainer assembly 283 include a set of ribs (not shown) on the exterior thereof, and that a corresponding segment of the radiotelephone frame include keyed slots (also not shown) for receiving the exterior ribs. This configuration can help keep or retain the bearing retainer in position as the components can be subjected to handling forces (i.e., dropped) which can misalign or move the components. This can also help keep the bearing retainer in its preferred position since the flip is also preferably pre-loaded.

Figure 17A:
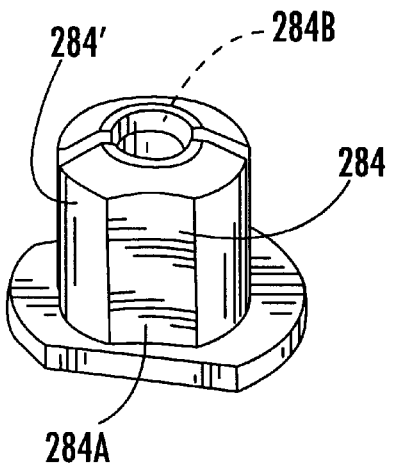
FIG. 17A is a perspective view of an additional embodiment of a detent cam according to the present invention.
Figure 17:
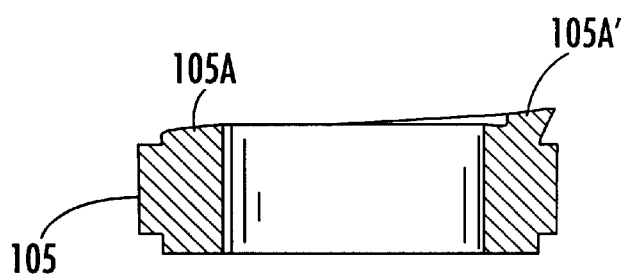
FIG. 17 is a section view of a detent cam according to the present invention.
Figure 17B:
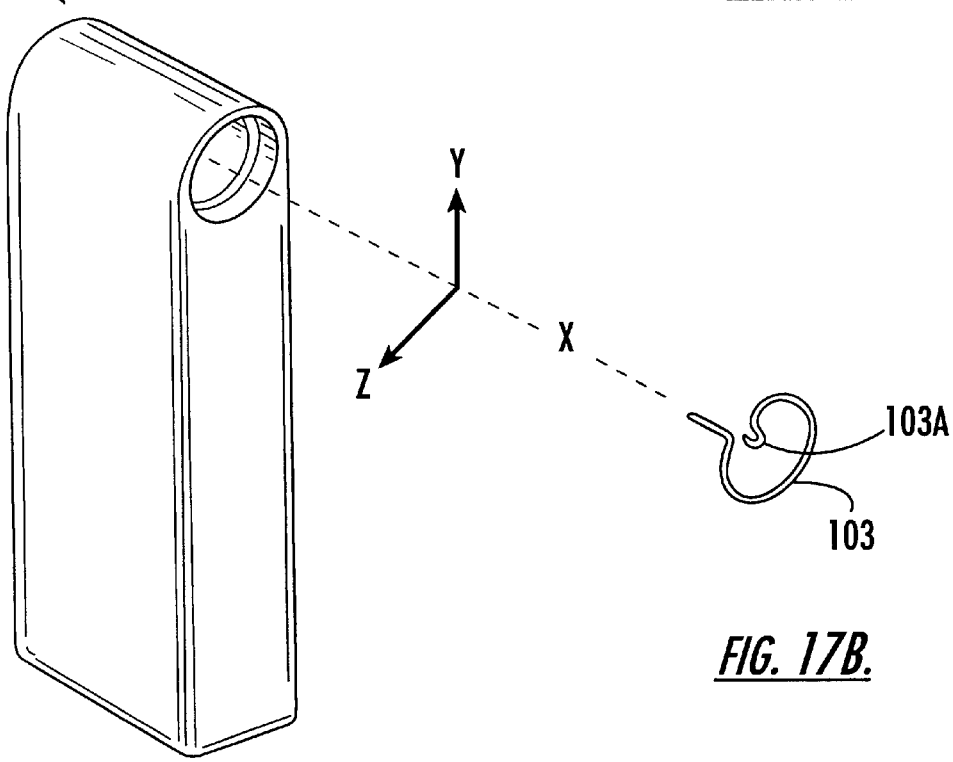
FIG. 17B is an isometric view of a detent spring according to one embodiment of the present invention.

Referring now to FIGS. 17 and 17A, preferred detent cams 105, 284 and associated cam surfaces 105A and 284A, 284B are illustrated. As shown in FIG. 17, the cam surface 105A is on the end of the detent cam and includes an inclined ramp portion 105A'. This detent cam 105 is stationary in the radiotelephone body 15 and is preferably held in position by the bearing retainer 110. In contrast, as shown in FIG. 17A, the cam surface 284' includes a pair of spaced-apart flat segments 284A, 284B along the body of the component. This detent cam 284 is fixed to the lower portion of the antenna and rotates with the antenna.

The detent spring 282 rides against (follows) the exterior body surface of the detent cam 284. As such, the actuation force exerted on the antenna to deploy or rotate the antenna is dependent on the spring load force introduced via the attached detent cam. This deployment or actuation force varies as the spring force increases and decreases according to the rise and fall of the cam surface profile (the planar segments 284A, 284B and the adjacent curved or inclined segments). Preferably, the detent spring floats at 0 degrees and 210 degrees (is not loaded) and extends to ride in tension and loaded against the cam body 284 at the angles therebetween.

D. Low Turning-Force Mounting Configurations

In operation, the configurations described above preferably provide a "low-turning force" translation of the antenna (and the flip). As used herein, the term "low-turning" force includes antenna and/or cover configurations which translate corresponding to spring forces of about 5–7 Ncm, and preferably forces on the order of less than about 5 Ncm. This low turning force allows the smaller (dual) mounting structures of the instant invention to be reliable, durable, and yet smaller in size over conventional radiotelephone structures.

E. Other Embodiments

As will be appreciated by those of skill in the art, the biasing structure contemplated by the present invention is not limited to the embodiments described above. Other mounting configurations can also provide selective biasing according to the present invention. For example, instead of an antenna single end connection as shown by FIG. 1 or the antenna mounted inward from the end of the body (FIGS. 3 and 4), the antenna (not shown) can be alternatively configured with a pair of downwardly extending arms which connect to the radiotelephone body or frame. The arms can include inwardly extending protrusions or nubs positioned about a pivot locator post. In operation, the pivot nubs engage with a series of shallows or dimples located about a circular path traveled by the pivot nubs (positioned on the radiotelephone body) in response to the antenna rotating from the stow to open position. The interaction between the post, nubs, and dimples act to urge the antenna toward certain positions, i. e., bias the antenna toward the open position or stow position.

In addition, for ease of discussion above, certain of the embodiments have discussed only one radiotelephone body style or flat blade/flip structure; however, the invention is not limited thereto. Biasing structures can be used with other flip and blade antenna configurations as will be appreciated by those of skill in the art. Advantageously, the biasing structure and mounting configurations of the instant invention enables a flip-style radiotelephone to properly position the blade antenna away from the flip in operation. Further, the biasing structure can reduce the handling abuse and potential deformation in the flexible antenna during use by biasing the antenna toward the open and stow position to assist in the translation of the antenna into position with minimal user required input forces.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An antenna and flip hinge assembly for a radiotelephone, comprising:
   a radiotelephone body having first and second end portions;
   a flat blade antenna pivotably attached to said radiotelephone body first end portion;
   a flip member pivotably attached to said radiotelephone body first end portion, said flip member being attached on said first end portion spaced-apart from said flat blade antenna;
   wherein said flat blade antenna and said flip member are individually rotatable from a first stow position wherein each of said flat blade antenna and said flip member are positioned to overlie said radiotelephone body, to a second open position wherein said flip member and said flat blade antenna are positioned above and extend longitudinally away from said radiotelephone body relative to said stow position, and wherein said flip member moves through a first angle of rotation relative to said radiotelephone body and said flat blade antenna moves through a second angle of rotation relative to said radiotelephone body such that said second angle of rotation is greater than said first angle of rotation; and
   a biasing structure operably associated with said blade antenna, said biasing structure configured such that said blade antenna is biased toward said open position.

2. An antenna and flip hinge assembly according to claim 1, wherein said flat blade antenna comprises a radiating electrical element which is at least partially defined by a flexible substrate, and wherein said biasing structure is configured such that beyond a preselected angle of rotation in the opening direction said blade antenna is biased toward said blade antenna open position.

3. An antenna and flip hinge assembly according to claim 1, wherein said biasing structure is configured such that at angles less than a preselected angle of rotation in the closing direction said blade antenna is biased toward said stow position.

4. An antenna and flip hinge assembly according to claim 2, wherein said opening preselected angle is equal to about the angle of said flip in said open position.

5. An antenna and flip hinge assembly according to claim 1, wherein the difference between said first and second angles of rotation is at least about 30 degrees.

6. An antenna and flip hinge assembly according to claim 2, wherein said biasing structure biases said blade antenna toward said blade antenna open position beyond about 180 degrees of rotation in the opening direction.

7. An antenna and flip hinge assembly according to claim 2, wherein said biasing structure is configured to provide a rotational force vector which increases and then decreases during deployment of said flat blade antenna to said open position.

8. An antenna and flip hinge assembly according to claim 3, wherein said biasing structure is configured to provide a rotational force vector which increases and then decreases during rotation of said flat blade antenna from the open position back to said stow position.

9. An antenna and flip hinge assembly according to claim 7, wherein said flat blade antenna rotational force vector is responsive to translation of said flat blade antenna beyond pre-selected angles of rotation as said blade antenna travels to said open and stow positions.

10. An antenna and flip hinge assembly according to claim 1, wherein said flat blade antenna and said flip member rotate on said radiotelephone housing with low-turning forces.

11. An antenna hinge assembly for a radiotelephone, comprising:
   a radiotelephone body having a hinging portion with a first cavity;
   a cylindrical bearing retainer comprising an outer surface and an inner cavity positioned affixed in to said radiotelephone body first cavity such that said bearing retainer transversely extends a distance out of said radiotelephone first cavity;
   a blade antenna having a lower portion with a transversely extending shell with an inner wall, said shell being sized and configured to receive a portion of said bearing retainer therein, said blade antenna being pivotably attached to said radiotelephone body hinging portion such that said shell inner wall rides on said bearing retainer outer surface as said blade antenna rotates during use, wherein said blade antenna is rotatable from a first stow position in which said blade antenna substantially overlies said radiotelephone body to a second open position in which said blade antenna longitudinally extends above and away from said radiotelephone body;
   a detent cam having a cam surface operably associated with said blade antenna positioned intermediate said blade antenna and said body hinging portion; and
   a detent spring operably associated with said detent cam.

12. An antenna hinge assembly according to claim 11, wherein said detent cam, said detent spring and said blade antenna pivotable attachment define a biasing structure which biases said blade antenna toward said open position.

13. An antenna hinge assembly according to claim 12, wherein said blade antenna comprises a flexible radiating electrical element, and wherein said biasing structure has an associated rotational turning force which increases and then decreases as said blade antenna rotates from said first stow position to said second open position to bias the advancement of said blade antenna beyond a preselected position.

14. An antenna hinge assembly according to claim 11, wherein said blade antenna travels through at least about 180 degrees as it moves from said stow position to said open position.

15. An antenna assembly according to claim 13, wherein said rotational turning force increases as said blade antenna moves beyond about 180 degrees from the stow position during opening.

16. An antenna assembly according to claim 12, wherein said detent cam surface is configured to introduce variable rotational turning forces on said blade antenna to bias said blade antenna to said stow position during closing.

17. An antenna assembly according to claim 16, wherein said turning force increases as said blade antenna returns from said open position to a position which is below about 180 degrees from said stow position during closure.

18. An antenna assembly according to claim 11, wherein said detent cam is fixedly attached to said bearing retainer such that it does not rotate with said blade antenna.

19. An antenna assembly according to claim 11, wherein said detent cam is affixed to said blade antenna such that it rotates therewith.

20. A flip and antenna hinge assembly for a radiotelephone, comprising:
- a radiotelephone body having a hinging portion with transversely extending first and second cavities each having opposing first and second ends, said cavities being spaced-apart;
- a first cylindrical bearing retainer comprising an outer surface and an inner cavity positioned in said first cavity of said radiotelephone body hinging portion such that said first bearing retainer transversely extends out of one end of said first cavity;
- a second cylindrical bearing retainer comprising an outer surface and an inner cavity positioned in said second cavity of said radiotelephone body hinging portion such that said second bearing retainer transversely extends out of one end of said second cavity;
- a blade antenna comprising a flexible radiating element having a lower hinging portion pivotably attached to said radiotelephone body hinging portion such that said blade antenna lower hinging portion is sized and configured to receive a portion of said first bearing retainer therein, said blade antenna being rotatable from a first stow position in which said blade antenna substantially overlies said radiotelephone body to a second open position in which said blade antenna longitudinally extends above and away from said radiotelephone body;
- a flip member having a lower hinging portion pivotably attached to said radiotelephone body hinging portion such that said flip member is configured to receive a portion of said second bearing retainer therein, said flip member being rotatable from a first stow position wherein said flip member substantially overlies said radiotelephone body to a second open position wherein said flip member longitudinally extends above and away from said radiotelephone body; and
- a biasing structure comprising:
  - a detent cam having a cam surface operably associated with said blade antenna positioned intermediate said blade antenna lower hinging portion and said radiotelephone body hinging portion; and
  - a detent spring operably associated with said detent cam and said blade antenna.

21. A flip and antenna assembly for a radiotelephone according to claim 20, wherein said biasing structure is configured to introduce a rotational turning force onto said blade antenna to bias said blade antenna forward, and wherein as said blade antenna rotates from the first stow position to the second open position, said rotational turning forces increase and then decrease to bias said blade antenna toward the open position.

22. A flip and antenna hinge assembly for a radiotelephone according to claim 20, wherein said detent cam surface contacts said detent spring and introduces variable spring forces thereon, and wherein said variable spring forces correspond to variable rotational turning forces introduced onto said blade antenna to bias said blade antenna to said open and said stow positions.

23. A flip and antenna hinge assembly for a radiotelephone according to claim 21, wherein said blade antenna travels beyond about 180 degrees to the open position from the stow position.

24. A flip and antenna hinge assembly for a radiotelephone according to claim 23, wherein said turning force increases as said blade antenna moves beyond about 180 degrees from the stow position during opening.

25. A flip and antenna hinge assembly for a radiotelephone according to claim 21, wherein said turning force increases upon rotation of said blade antenna back toward the stow position from the open position to bias the blade antenna back to the stow position.

26. A flip and antenna hinge assembly for a radiotelephone according to claim 20, wherein said detent cam is fixedly attached to said bearing retainer such that it does not rotate with said blade antenna.

27. A flip and antenna hinge assembly for a radiotelephone according to claim 20, wherein said detent cam is affixed to said blade antenna such that it rotates therewith.

28. A flip and antenna hinge assembly for a radiotelephone according to claim 20, wherein said blade antenna travels beyond said flip member to the open position.

29. A flip and antenna hinge assembly for a radiotelephone according to claim 28, wherein said blade antenna opens about at least 30 degrees beyond said flip member when said blade antenna and flip member are in their respective open positions.

30. A method of mounting a flat blade antenna and flip member to a radiotelephone with a user interface comprising the steps of:
- pivotably mounting a flat blade antenna to an end portion of the radiotelephone such that the flat blade rotates from a stow position wherein the antenna substantially overlies the radiotelephone user interface to an open position longitudinally above and away from the user interface;
- separately pivotably mounting a flip member to said end portion of the radiotelephone such that the flip member rotates from a stow position wherein the flip member substantially overlies the radiotelephone user interface to a open position longitudinally above and away from the user interface; and
- mounting a biasing structure in said end portion of the radiotelephone so that the blade antenna is biased to travel beyond a predetermined angle of rotation in the opening direction such that the blade antenna rotates through a greater angle of rotation than the flip member to position the blade antenna away from the flip member in the open position.

31. A method according to claim 30, wherein said biasing structure mounting step includes assembling the biasing structure so that it introduces a variable rotational turning force onto the blade antenna, the variable rotational force increasing at about 180 degrees from the stow position and decreasing thereafter to bias the blade antenna opening beyond the flip member and into an open position which is above about 180 degrees relative to the stow position.

32. A method according to claim 31, wherein the variable rotational turning force also increases upon rotation of the blade antenna toward the stow position to bias the blade antenna back to the stow position.

33. A method according to claim 30, wherein said blade antenna mounting step and said flip member mounting step comprises offsetting the antenna axis of rotation and the flip member axis of rotation on the end portion of the radiotelephone.

* * * * *